US009015570B2

(12) United States Patent
Rance et al.

(10) Patent No.: US 9,015,570 B2
(45) Date of Patent: Apr. 21, 2015

(54) SYSTEM AND METHOD FOR PROVIDING A WEB EVENT CHANNEL PLAYER (75) Inventors: Peter Rance, London (GB); Dorian Logan, London (GB); Kenneth Winter, London (GB)

(73) Assignee: BrightTALK Ltd., London (GB)

( * ) Notice: Subject to any disclaimer, the term of this patent is extended or adjusted under 35 U.S.C. 154(b) by 908 days.

(21) Appl. No.: 12/004,532

(22) Filed: Dec. 21, 2007

(65) Prior Publication Data
US 2009/0164875 A1 Jun. 25, 2009

(51) Int. Cl.
*G06F 17/00* (2006.01)
*H04N 7/173* (2011.01)
*G06Q 30/06* (2012.01)
*H04L 12/18* (2006.01)
*H04N 21/2368* (2011.01)
*H04N 21/472* (2011.01)
*H04N 21/61* (2011.01)
*H04L 29/06* (2006.01)

(52) U.S. Cl.
CPC .......... *H04N 7/17318* (2013.01); *G06Q 30/06* (2013.01); *H04L 12/1822* (2013.01); *H04N 21/2368* (2013.01); *H04N 21/47202* (2013.01); *H04N 21/47208* (2013.01); *H04N 21/6125* (2013.01); *H04L 65/4015* (2013.01)

(58) Field of Classification Search
USPC .................................................. 715/201–205
See application file for complete search history.

(56) References Cited

U.S. PATENT DOCUMENTS

| | | |
|---|---|---|
| 5,565,923 A | 10/1996 | Zdepski |
| 6,442,598 B1 | 8/2002 | Wright et al. |
| 6,728,753 B1 | 4/2004 | Parasnis et al. |
| 6,728,759 B1 | 4/2004 | Na |
| 6,760,749 B1 | 7/2004 | Dunlap et al. |
| 6,774,926 B1 | 8/2004 | Ellis et al. |
| 7,050,603 B2 | 5/2006 | Rhoads et al. |
| 7,142,250 B1 | 11/2006 | Black |
| 7,328,239 B1 | 2/2008 | Berberian et al. |
| 7,369,515 B2 | 5/2008 | Salesky et al. |
| 7,412,533 B1 | 8/2008 | Johnson et al. |
| 7,751,347 B2 | 7/2010 | Giroti |
| 8,446,846 B1 | 5/2013 | Saleem et al. |
| 8,514,762 B2 | 8/2013 | Du Hart, IV et al. |
| 2001/0047516 A1* | 11/2001 | Swain et al. ..................... 725/86 |
| 2002/0016858 A1 | 2/2002 | Sawada et al. |
| 2002/0036694 A1* | 3/2002 | Merril ........................... 348/220 |
| 2002/0103696 A1 | 8/2002 | Huang et al. |
| 2002/0104096 A1 | 8/2002 | Cramer et al. |
| 2002/0116297 A1* | 8/2002 | Olefson ........................ 705/27 |
| 2002/0120939 A1 | 8/2002 | Wall et al. |
| 2002/0198943 A1 | 12/2002 | Zhuang et al. |
| 2003/0034999 A1 | 2/2003 | Coughlin, III et al. |
| 2003/0158816 A1 | 8/2003 | Rouse |
| 2003/0200001 A1 | 10/2003 | Goddard |
| 2004/0032424 A1 | 2/2004 | Florschuetz |
| 2004/0153504 A1 | 8/2004 | Hutchinson et al. |

(Continued)

*Primary Examiner* — Chau Nguyen
(74) *Attorney, Agent, or Firm* — Carr & Ferrell LLP (57) ABSTRACT

Embodiments of the present invention provide systems and methods for providing access to a channel via an embedded web event channel player. In exemplary embodiments, an embeddable code associated with the channel is provided to a channel owner. Once embedded, the code will provide an instance of the channel player on a user's device that can access the channel. A list of events is aggregated and provided for the channel associated with the channel player. Upon a request by a user, an event from the list of events may be streamed to the channel player.

18 Claims, 7 Drawing Sheets

(56) References Cited

U.S. PATENT DOCUMENTS

| | | |
|---|---|---|
| 2004/0193683 A1 | 9/2004 | Blumofe |
| 2004/0225728 A1 | 11/2004 | Huggins et al. |
| 2004/0243922 A1 | 12/2004 | Sirota et al. |
| 2005/0076387 A1* | 4/2005 | Feldmeier ............... 725/114 |
| 2005/0125453 A1* | 6/2005 | Rozack ................. 707/104.1 |
| 2005/0160367 A1 | 7/2005 | Sirota et al. |
| 2006/0179454 A1* | 8/2006 | Shusman .................. 725/45 |
| 2007/0044133 A1* | 2/2007 | Hodecker ............... 725/117 |
| 2007/0078768 A1* | 4/2007 | Dawson ................... 705/50 |
| 2007/0118396 A1 | 5/2007 | Matz et al. |
| 2008/0195743 A1 | 8/2008 | Brueck et al. |
| 2008/0196079 A1 | 8/2008 | Lee et al. |
| 2009/0019374 A1 | 1/2009 | Logan et al. |
| 2009/0024923 A1* | 1/2009 | Hartwig et al. ............... 715/716 |
| 2009/0037520 A1 | 2/2009 | Loffredo |
| 2009/0055385 A1* | 2/2009 | Jeon et al. ..................... 707/5 |
| 2009/0070407 A1 | 3/2009 | Castle et al. |
| 2009/0164876 A1 | 6/2009 | Logan et al. |
| 2009/0286509 A1 | 11/2009 | Huber et al. |
| 2010/0058410 A1 | 3/2010 | Rance et al. |
| 2010/0088126 A1 | 4/2010 | Iaia et al. |
| 2010/0293048 A1 | 11/2010 | Singolda et al. |
| 2012/0158888 A1 | 6/2012 | Rance et al. |
| 2012/0191582 A1 | 7/2012 | Rance et al. |

\* cited by examiner

SYSTEM AND METHOD FOR PROVIDING A WEB EVENT CHANNEL PLAYER

BACKGROUND OF THE INVENTION

1. Field of the Invention

Embodiments of the present invention relate generally to web events and more particularly to a web event distribution system.

2. Description of Related Art

Using the Internet to distribute videos is becoming increasingly prevalent. For example, YouTube allows a distributor to embed pre-recorded videos within a webpage. Typically, the pre-recorded videos are embedded by inserting a piece of code for each video. The code will provide a link to the video when activated.

In alternative embodiments, the distributor may upload pre-recorded videos to a content provider. The content provider may then provide a list of the uploaded pre-recorded videos on an associated website. Viewers may then access the pre-recorded videos via the associated website.

Furthermore, web conferencing and presentations are also increasing in popularity. Typically, participants will schedule a conference or presentation time. At the predetermined time, the participants will access a particular website or link. Subsequently, one or more of the participants will then present or moderate the conference. Typically, these conferences are not recorded for playback.

SUMMARY OF THE INVENTION

Embodiments of the present invention provide systems and methods for providing access to a channel via an embedded event channel player. In exemplary embodiments, an embeddable code associated with the channel is provided to a channel owner. The channel owner may embed the code anywhere the channel owner desires to provide access to their channel. For example, the channel owner may embed the code on a website under the control of the channel owner.

Once embedded, the code will provide an instance of the channel player on a user's device that can access the channel. When the user activates the code, the channel player may be provided, for example, in a browser of the user's computing device. The channel player may automatically access the associated channel.

A list of events is aggregated and provided for the channel associated with the channel player. In exemplary embodiments, a channel management system may maintain a database of past, archived events as well as details of planned upcoming events for each channel. The list may be presented via an interface that distinguishes archived from upcoming events. In some embodiments, a next event or live event may be graphically distinguished or highlighted. According to exemplary embodiment, the events comprise web events and may be listed in a chronological order.

Upon a request by a user, an event from the list of events may be streamed to the user's channel player. If the event is an archived event, the channel management system will immediate access a content database and provide a stream of the archived event to the channel player of the requesting user. If the event is an upcoming event, the user may register for the event, and at a start time associated with the upcoming event, a real-time stream of the event may be provided to the channel player of the requesting user. Finally, if the event is a live event, the requesting user may be provided a live audio (e.g., stream) of the event.

DETAILED DESCRIPTION OF EXEMPLARY EMBODIMENTS

Embodiments of the present invention provide systems and methods for providing a web event channel player. In exemplary embodiments, a code configured to provide the channel player may be embedded within a website. The channel player comprises an interface configured to provide access to a channel comprising past, current, and future events such as webcasts. These events may comprise web events and may include presentations such as, for example, slide shows that are synchronized with live audio. For simplicity of discussion, embodiments of the present invention will be discussed with reference to events, in general.

Figure 1:
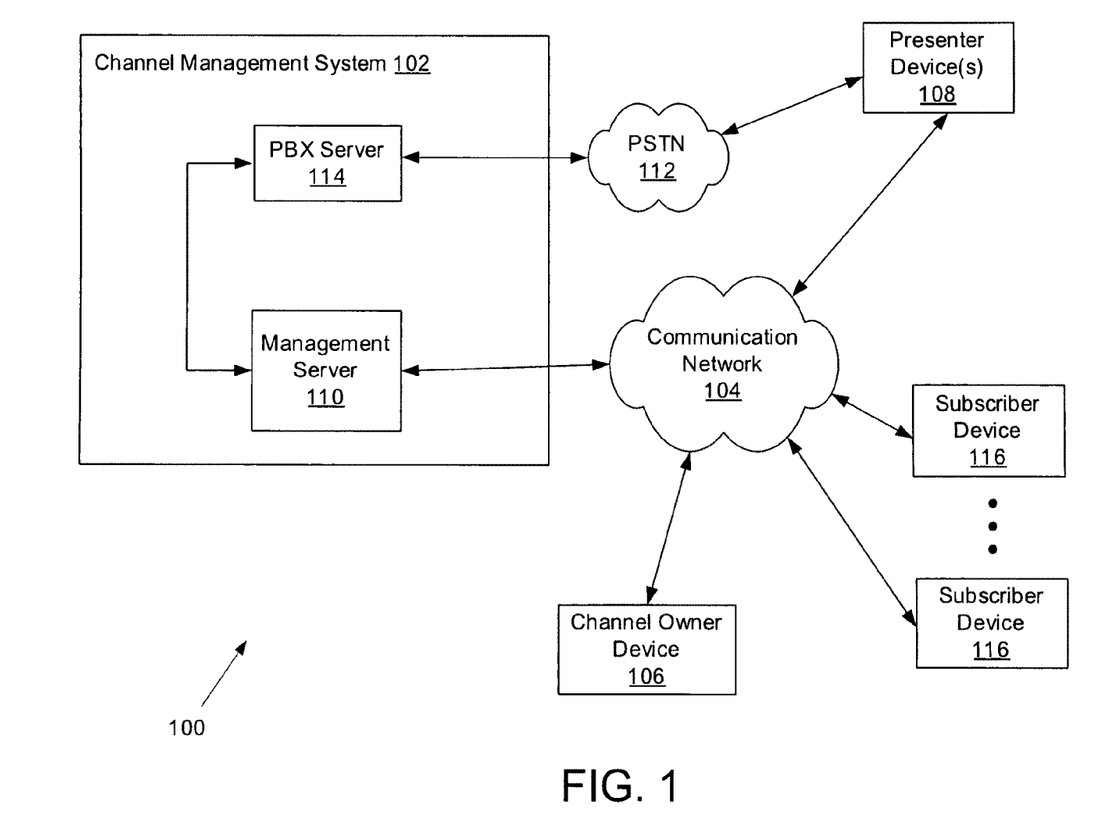
FIG. 1 is a diagram of an exemplary environment in which embodiments of the present invention may be practiced.

FIG. 1 shows an exemplary environment 100 in which embodiments of the present invention may be practiced. The exemplary environment 100 comprises a channel management system 102 in communication via a communication network 104 to a channel owner device 106. The communication network 104 may comprise the Internet, wide area network, and/or local area network.

The channel owner device 106 may comprise any computing device of a channel owner configured to disseminate information. Typically, a channel provided by the channel owner may be directed to a particular subject matter that is associated with the channel owner of the channel owner device 106. A channel owner may comprise any entity that desires to provide a medium for disseminating information. For example, an investment company may provide a channel that is directed to mutual fund and stock investment events. In some embodiments, a channel may be associated with more than one channel owner or a channel owner may be associated with more than one channel.

In exemplary embodiments, the channel owner embeds the code associated with the channel player in a website owned, provided by, or associated with the channel owner via the channel owner device 106. The code comprises one or more instructions executable by a processor. According to exemplary embodiments, access to the channel player is provided by embedding a piece of software code (e.g., single line of code) within a webpage where channel player access is desired. This single piece of software code will activate an instance of the channel player on a user's computing device (e.g., subscriber device 116), which will provide access to the channel provided by the channel owner device. It should be noted that any number of users may activate the code to bring up an instance of the channel player on their respective computing devices. Each user will then have access to the channel and have independent control over what content to view (e.g., which events of the channel to access).

In an alternative embodiment, users may activate a channel player via a link or code on a website associated with the channel management system 102, on a website that is not owned, provided by, or associated with the channel owner (i.e., a non-channel owner), or be directed to a stand-alone version of the channel player. In this latter embodiment, the code is not embedded within a webpage associated with the channel owner. Instead, the channel player may be accessed, for example, by accessing a link associated with a channel management system 102 website or activating a link which directs the user to the stand-alone channel player. This link may be provided, according to one embodiment, in a communication from the channel owner device 106 to users (e.g., an e-mail message). The stand-alone channel player may comprise a program that installs on a computing device and is executed outside of a web browser. Alternately, the code may comprise javascript which calls the management server 110 to launch the channel player.

Accordingly, all events (e.g., webcasts) of the channel may be under the control of the channel owner and/or the channel owner device 106. As such, the channel owner may arrange for one or more presenters via their associated presenter devices 108 to present events on the channel owner's channel. The presenter devices 108 may provide images, such as slides and videos via the communication network 104 to a management server 110 of the channel management system 102 prior to or during the event. The management server 110 will be discussed in more details in connection with FIG. 2 below.

The presenter may also provide live audio (e.g., commentary during the event). In one embodiment, the audio is provided via the communication network 104 (e.g., VoIP). In an alternative embodiment, the audio is provided via a phone call conducted over a public switched telephone network (PSTN) 112. In this embodiment, the audio is received by a private branch exchange (PBX) server 114 of the channel management system 102. In yet another embodiment, the audio may be provided via a video.

In exemplary embodiments, the audio and images received by the channel management system 102 may be synchronized by the management server 110 as will be described in further details below. It should be noted that the event may comprise only audio, only images, or a combination of audio and images. The event audio and/or images may be pre-recorded or provided in real-time during a live event.

The exemplary PBX server 114 may be configured to function as a conference bridge. By using the conference bridge, a plurality of presenters on a same event can hear each other on the telephone system. In some embodiments, one or more presenters may call into the PBX server 114 to provide the live audio during a webcast. The live audio may, according to exemplary embodiments, be received via PSTN 112 or VoIP (e.g., SIP G.711). In a further embodiment, the PBX server 114 is enabled to receive high-definition audio, and to forward the received high-definition audio onward to the management server 110 for processing.

In yet another embodiment, the PBX server 114 may receive audio from a plurality of presenters and provide each stream of audio from each presenter to the management server 110 via a separate audio channel. That is, each presenter audio channel is individually sourced. As a result, monoaural presenter channels may be combined into a stereo mix by the management server 110.

In exemplary embodiments, one or more of the presenters are associated with a computing device (i.e. presenter device 108) from which control over images or videos during the event is enabled. In these embodiments, the computing device will comprise a channel application which controls, for example, slide changes during the live event.

The environment also comprises a plurality of subscriber devices 116 associated with users or subscribers. These subscribers each subscribe to one or more channels associated with the channel management system 102 and/or the channel owner. Once subscribed, the subscriber will have access to events within the subscribed-to channel via their computing device. Thus, for example, the subscriber can access archived past events and view live events via a browser application on their subscriber device 116. The subscriber device 116 may also access a list of future, planned events. According to some embodiments, the subscriber may receive communications from the channel owner regarding future events.

It should be noted that the environment 100 of FIG. 1 is exemplary. Alternative embodiments may comprise additional or fewer elements and still be within the scope of embodiments of the present invention. For example, any number of channel owner devices 106, presenter devices 108, and subscriber devices 116 may be present in the environment 100 at any one time. Furthermore, the channel management system 102 may be comprised of more servers. For example, regional management servers 110 may be provided.

Figure 2:
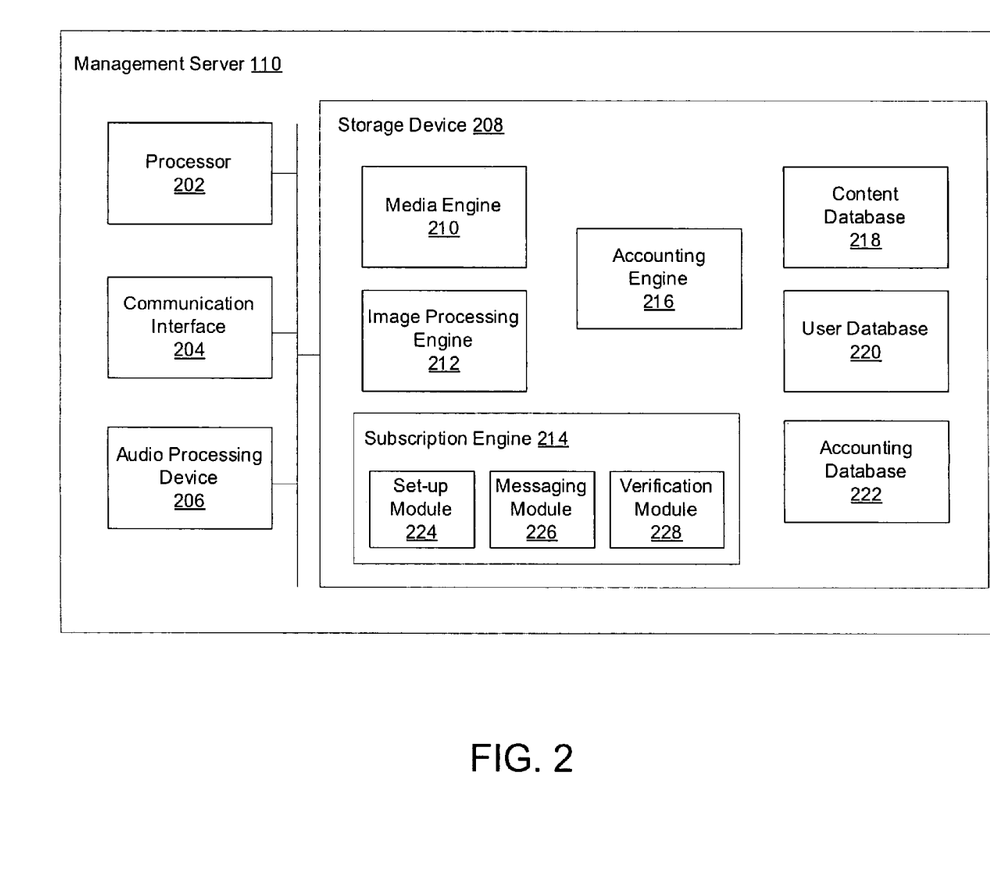
FIG. 2 is a block diagram of an exemplary management server, according to one embodiment of the present invention.

Referring now to FIG. 2, the management server 110 is shown in more details. The exemplary management server 110 is configured to provide the live event to the channel players. The live event is provided to the channel players in substantially real-time. In one embodiment, the management server 110 may also encode the content of each live event. This encoding may be performed on-the-fly. That is, for example, live audio may be synchronized with pre-created images during a live event (e.g., webcast). The management server 110 may also manage channel owners and subscribers, track event activities (e.g., which subscriber device 116 is accessing which event), and archive and provide access to past events.

The exemplary management server 110 may comprise a processor 202, a communication interface 204, an audio processing device 206, and at least one storage device 208. It should be noted that while all these components and associated functionalities are described as operating within a single management server 110, embodiments of the present invention contemplate having more than one server for providing the components and functions of the management server 110.

In exemplary embodiments, the communication interface 204 is configured to interface the management server 110 with the various networks and servers. In one embodiment, the communication interface 204 comprises a VoIP client for directly receiving audio or video including audio from the presenter device 108 via the communication network 104. In other embodiments, the communication interface 204 comprises a VoIP client for receiving the audio from the PBX server 114. In these embodiments, the audio from one or more presenter devices 108 may be received via various PSTN or VoIP protocols (e.g., SIP G.711 or other similar protocols). Alternatively, high-definition audio may be received from the presenter. In yet another alternative embodiment, a plurality of independent audio streams (e.g., from individual channels) from each presenter may be received from the PBX server 114.

According to exemplary embodiments, the audio processing device 206 is enabled to apply gain control to the received audio and provide the processed audio to a media engine 210 for encoding. By using the audio processing device 206, performance requirements of an encoder of the media engine 210 may be reduced since there is no need to transcode the audio. In some embodiments, the audio processing device 206 may comprise a sound card. In alternative embodiments, the audio processing device 206 may comprise software which eliminates the need for the sound card. In yet another embodiment, the PBX server 114 may perform protocol conversion (e.g., into a format that is compatible with subscriber devices 116), thus eliminating the need to transcode the audio.

The storage device 208 may comprise one or more devices which function as memory or storage for the management server 110. The exemplary storage device 208 may comprise the media engine 210, an image processing engine 212, a subscription engine 214, an accounting engine 216, and a plurality of databases. These databases may comprise a content database 218, a user database 220, and an accounting database 222.

The exemplary media engine 210 is enabled to provide live events and/or requested past events to subscriber devices 116. The media engine 210 may be further configured to allow channel owners and/or presenters to establish events on a channel. The media engine 210 will be discussed in more details in connection with FIG. 3 below.

In order to handle a plurality of subscribers accessing one or more live events at the same time, the media engine 210 may utilize a data push model during the live event. In one example, once a live event has begun, the media engine 210 pushes content to the subscribing channel players. As a result, during the live event, the users of the channel players do not, in various embodiments, send commands (e.g., refresh commands or commands for the next slide) to the media engine 210.

In various embodiments, the management server 110 tries to limit data pulls. Prior to the live event, the subscriber may pull (e.g., transmit a request) for data until a data stream is received. When a state change occurs (e.g., an interruption in the delivery of the event) during an event, a file may be generated by the media engine 210 which represents the state change (e.g., a notice to the subscribers that an interruption has occurred). In various embodiments, the user may be placed back in a "pull mode" thereby requesting data until the live event can be reestablished. In one example, the media engine 210 provides a message to all requests for data (i.e., "pulls" from the subscribers) indicating the status of the live event.

The image processing engine 212 may be configured to receive and process any images that will be used in live events. Images can include, but are not limited to, pictures, videos, individual slides, slide shows, animation, or any combination of these images. In some embodiments, the images may comprise slides that will be presented during the live events. Accordingly, the images may be pre-loaded by the presenter via the channel application on the presenter device 108. During a live event, commands affecting images are received and processed by the image processing engine 212. Thus, for example, if the presenter moves to a next slide, a command is received from the channel application associated with the presenter device 108 and the image processing engine 212 will then provide the next slide to the media engine 210. In some embodiments, the images may be stored in the content database 218.

In some embodiments, a delay may be introduced into a live audio track in order to compensate for latency associated with command processing. Because there may be less delay in the audio track than in a web interface which delivers the command, the delay may be used to off-set the experience. In one example, the delay is for two seconds.

The exemplary subscription engine 214 is configured to manage channel subscribers and/or their subscriber devices 116. In various embodiments, the subscription engine 214 may comprise a set-up module 224, a messaging module 226, and a verification module 228. Other modules associated with subscribers, subscriber devices 116, and subscriber services may be provided.

The first time a user accesses the channel management system 102 (e.g., access any channel associated with the channel management system 102), the user may be requested to join channel management system network. Accordingly, the set-up module 224 may provide questions and request user information from the user. The user information may then be stored in the user database 220 and associated with the user. As a result, an account may be established for each user.

In one embodiment, the establishment of the account will cause the user to be a subscriber to a current channel being accessed. Thus, the user is now a channel subscriber. As a subscriber, the user may have access to some or all content within the channel. In one example, the subscriber device 116 (associated with the subscriber with the account) can access all past, archived events of the channel through the channel player. The subscriber device 116 can also receive a live event of the channel through the channel player. Additionally, the subscriber device 116 may be provided with a list of future, scheduled events for the channel player.

In accordance with one embodiment, preferences may be set such that when the subscriber returns to the subscribed-to channel, the management server 110 will recognize the subscriber device 116 and/or the subscriber. As such, the subscriber device 116 may directly access the channel player content without having to identify the subscriber to the verification module 228 or log in.

When the user accesses a different channel which the user has not subscribed to, the subscription engine 214 may automatically verify the user's identity via the verification module 228 using stored user information. However, the user, in accordance with some embodiments, may need to accept terms and conditions of the new channel in order to subscribe to the new channel. In one example, selection of a subscription button will activate the subscription to that new channel. Because the channel management system 102 already has the user information stored, the user may not need to provide any further information to subscribe to the new channel.

In some embodiments, the messaging module 226 may be provided to notify subscribers of upcoming events. For example, an invitation may be sent to the subscriber device 116 of a subscriber to the channel to attend the next event. In some embodiments, the invitation may comprise a link to access the channel player, the channel, and/or the event.

The exemplary accounting engine 216 is configured to manage channel owners and/or channel owner devices 106. In exemplary embodiments, the channel owner may pay a fee for establishing a channel, advertising the channel, having audience participation (e.g., pay the audience for attending and responding) and/or for other functions and services provided by the channel management system 102. The channel owner may also receive fess from the audience, from purchased content, or from sponsors, for example. The accounting engine 216 may maintain records of all these fees.

The accounting engine 216 may also be configured to allocate resources to the channels of the channel owner. For example, a particular channel may be provided a certain amount of content database 218 storage space based on a subscription plan of the channel owner. The information associated with the accounting engine 216 may be stored in the accounting database 222.

Figure 3:
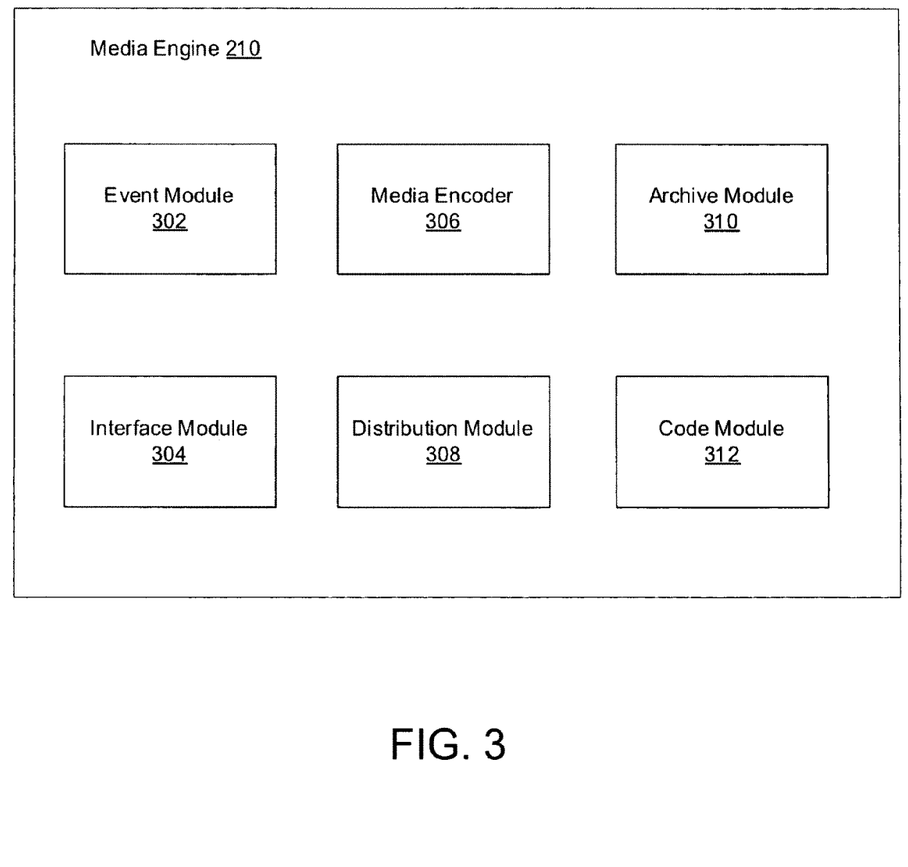
FIG. 3 is a block diagram of an exemplary media distribution engine.

Referring now to FIG. 3, the media engine 210 is shown in more detail. In exemplary embodiments, the media engine 210 is enabled to provide live events and requested past events to subscriber devices 116 via the channel player. In accordance with one embodiment, the media engine 210 comprises an event module 302, an interface module 304, a media encoder 306, a distribution module 308, an archive module 310, and a code module 312.

In exemplary embodiments, the event module 302 is configured to allow the channel owner (e.g., via the channel owner device 106) and/or the presenter (e.g., via the presenter device 108) to establish events on a channel. The event module 302 may provide an interface which allows the channel owner or presenter to enter details of a new event. The details may comprise title of the event, description, event time, etc. The event module 302 may also allow the presenter device 108 to upload images such as slides and/or videos, to the management server 110 prior to the live event. In an alternative embodiment, the image processing engine 212 may perform the function of uploading images to the management server 110. Additionally, the event module 302 may aggregate a list of upcoming and archived events.

The exemplary interface module 304 provides various interfaces on the channel player. One such interface comprises a listing of one or more events. The events may comprise any combination of past, current, and/or future events. Examples of the interface will be discussed in more details in connection with FIG. 4a and FIG. 4b.

In exemplary embodiments, the media encoder 306 is configured to synchronize the audio (e.g., live audio or audio from a video) with optional images (e.g., video, slides, etc.), and provide the synchronized event to the subscriber devices 116. In some embodiments, more than one presenter may provide the images and/or audio during the live event. Once encoded (e.g., synchronized), the event may be distributed by the interface module 304 via the communication interface 204 to the subscriber devices 116.

In exemplary embodiments, the live event will be archived and stored immediately or relatively soon after the distribution of the live event. The archived event may be stored in the content database 218. The listing of the events on the channel may then be updated by the interface module 304 to indicate that the previous live event is now an archived event.

Subsequently, subscriber devices 116 may access and request archived events via the distribution module 308. In one embodiment, when the subscriber selects an archived event from a list provided in the channel, the request is received by the distribution module 308. The distribution module 308 may then access the content database 218 to obtain the requested archived event. The archived event is then streamed to the channel player of the subscriber device 116 requesting the archived event. It should be noted that the functions of the interface module 304 and the distribution module 308 may be combined within a single module.

The exemplary code module 312 is configured to generate the embeddable code which provides access to the channel and provides an instance of the channel player on a subscriber device 116. In accordance with one embodiment, the code module 312 will generate the code based, in part, on information provided by the channel owner. The code may comprise generic coding to provide the channel player on a browser of the user or subscriber device 116 activating the code. The code may also comprise specific coding to indicate a particular channel. In some embodiments, the code module 312 is configured to provide the code to support channel players on different browsers. In one example, the code module 312 provides a first code to support a channel player when activated by Internet Explorer and a second code to support a channel player when activated by Firefox. The code module 312 may provide code that supports any type of browser on any type of operating system. The code module 312 may also provide code that supports different versions of browsers (e.g., Internet Explorer 6.x as opposed to Internet Explorer 7.x). In an alternative embodiment, the code module 312 may be located elsewhere in the management server 110 (e.g., in the accounting engine 216).

It should be noted that the management server 110 of FIG. 1 and the media engine 210 of FIG. 2 is exemplary. Alternative embodiments may comprise additional or fewer modules and still be within the scope of embodiments of the present invention. Further, the functions of the modules may be combined within fewer modules and still be within the scope of embodiments.

Figure 4A:
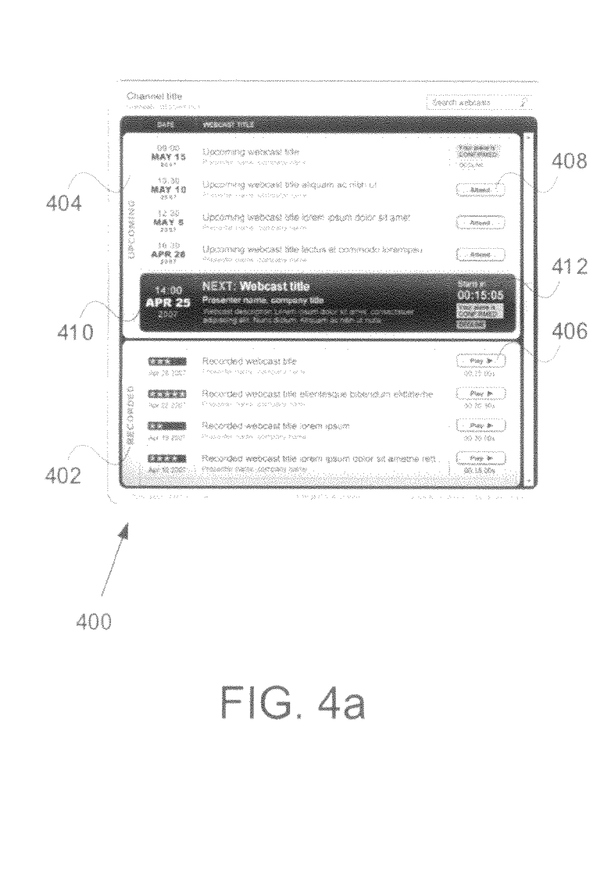
FIGS. 4a and 4b are exemplary channel interfaces of the channel player.

Referring now to FIG. 4a, an example of an event list channel interface 400 of a channel player is shown. In the present example, a list of archived (i.e., recorded) events of the channel is displayed on a lower portion 402 the channel interface 400, while a listing of upcoming, future events is displayed on a top portion 404 of the channel interface 400. Details of the events are also provided on the interface 400. In exemplary embodiments, titles, information regarding presenters, and date and time of each event, are provided. For archived events, a play button 406 is provided for access to the event, while an attend button 408 is provided for access to a future event.

A next event entry 410 may be distinguished from entries on the list. For example, the next event entry 410 may be highlighted, flashing, or of a different color scheme. The next event entry 410 may also provide a countdown timer or clock 412 which provides the time until the next event becomes live.

Figure 4B:
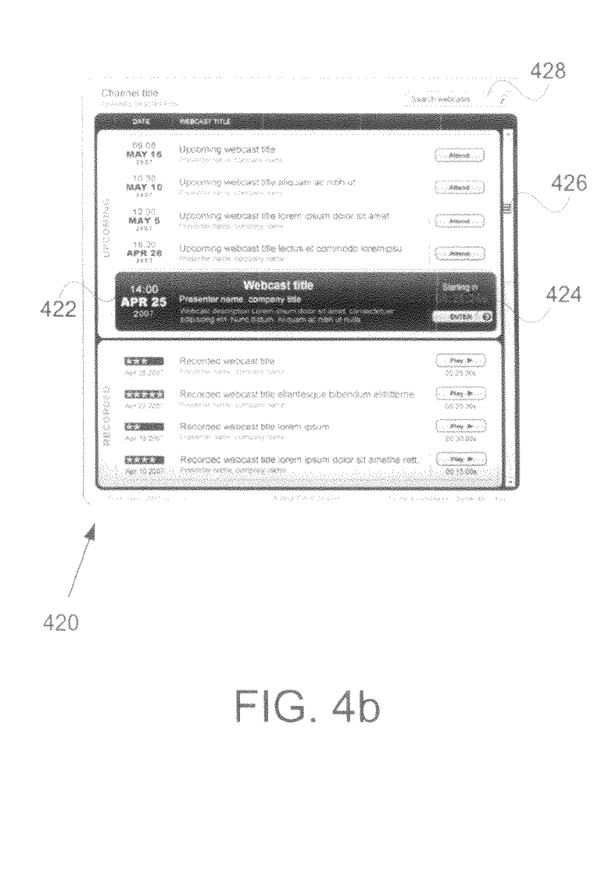

Referring now to FIG. 4b, an alternative event list channel interface 420 of the channel player is illustrated. The channel interface 420 provides a list of events whereby a current, live event entry 422 is highlighted. Furthermore, the attend button 408 is replaced with an enter button 424.

As illustrated by the channel interfaces 400 and 420, each channel aggregates content over a period of time. In exemplary embodiments, the most recent past events are listed in descending chronological order in the lower portion 402. Similarly, upcoming events are listed in chronological order in the top portion 404. In exemplary embodiments, any number of individuals (e.g., through channel owner device 106 and presenter devices 108) may contribute content to the channel. If more event entries are available than can be viewed on a single display of the channel interface 400 or 420, a scroll bar 426 may be provided. In some embodiments, a search field 428 may also be provided such that a subscriber may enter a keyword on the subscriber device 116 to find one or more events associated with the keyword. In alternative embodiments, tabs may be provided to differentiate the events. For example, one tab and associated list of events may be direct to archived events, while a second tab and associated list of events may be directed to upcoming events.

Figure 5:
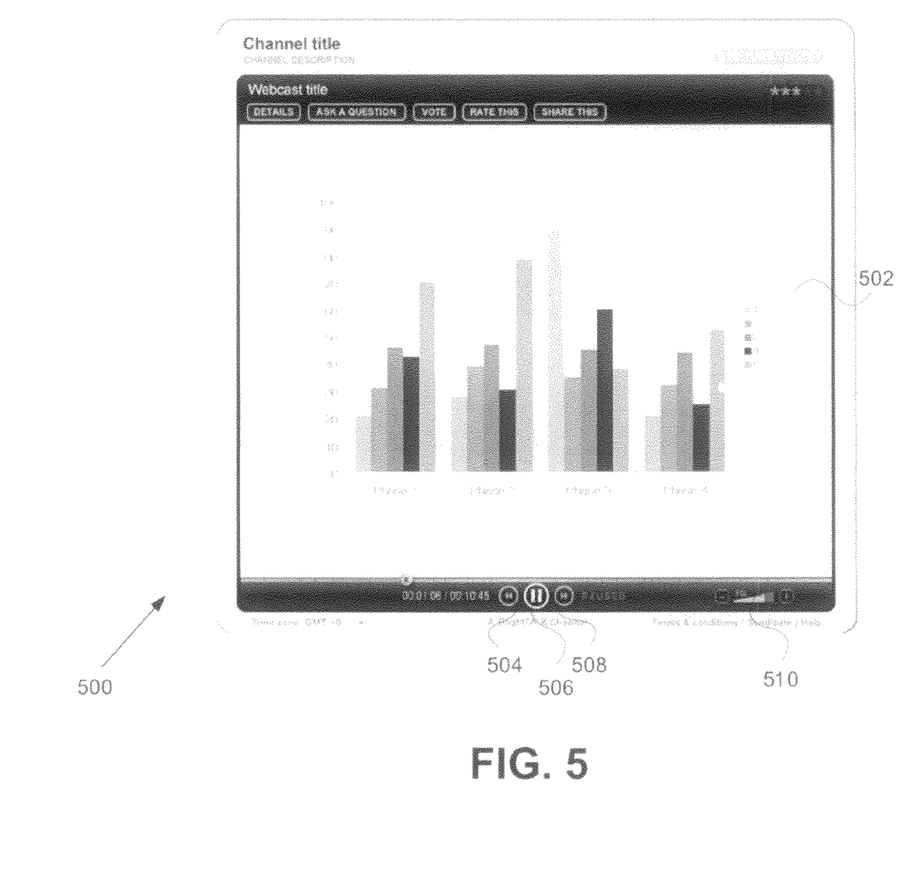
FIG. 5 is an exemplary event interface of the channel player.

When a subscriber activates the play button 406 (in a playback mode) or the enter button 424 (in a live mode), the channel player may immediately launch into the selected event. In exemplary embodiments, the channel interface 400 or 420 will be replaced with an event interface 500 of the channel player as shown in FIG. 5. The event interface 500 may provide an image portion 502 where images may be displayed. In some examples, the images comprise slides and/or videos. Further, synchronized audio from the presenter may also be played (i.e., synchronized) with the images. Synchronized audio may be streamed over the communication network 104 to the channel player. In other embodiments, audio (synchronized or unsynchronized) from the presenter is provided through the channel player with or without images.

In the playback mode (i.e., playing an archived event), the channel player may provide event control buttons. These event control buttons may comprise a rewind button 504, a play button 506, and a forward button 508. The channel player may also allow the subscriber of the subscriber device 116 to pause the event (e.g., using a pause button or by selecting the play button while the event is playing). Volume control 510 may also be provided in both the live mode and the playback mode of the channel player.

FIG. 5 shows one example of the channel player in an event mode (i.e., displaying the selected event). Other embodiments may provide different content within the channel player. For example, images may be provided in different portions of the channel player (e.g., live video of the presenter on a left portion and a slide show on a right portion). Alternatively, the subscriber may be able to toggle between various images.

It should be noted that the code for the channel player may be embedded such that the channel player may be launched with the list channel interface (i.e., in a list channel mode such as in FIG. 4a and FIG. 4b) or with the event interface (i.e., in the event mode such as in FIG. 5). For example, if a particular event is relevant to a piece of communication, the channel player may be launched in the event mode for the particular event. The user may switch between the two modes.

In some embodiments, the channel player may be of any size and be resizable. Thus, for example, the channel owner may be able to select a size for the channel player and embed the code such as to provide the instance of the channel player with the selected size within a display area on a webpage. This allows the channel player to be displayed within any sized templates. The channel player may also be displayed in full screen.

Figure 6:
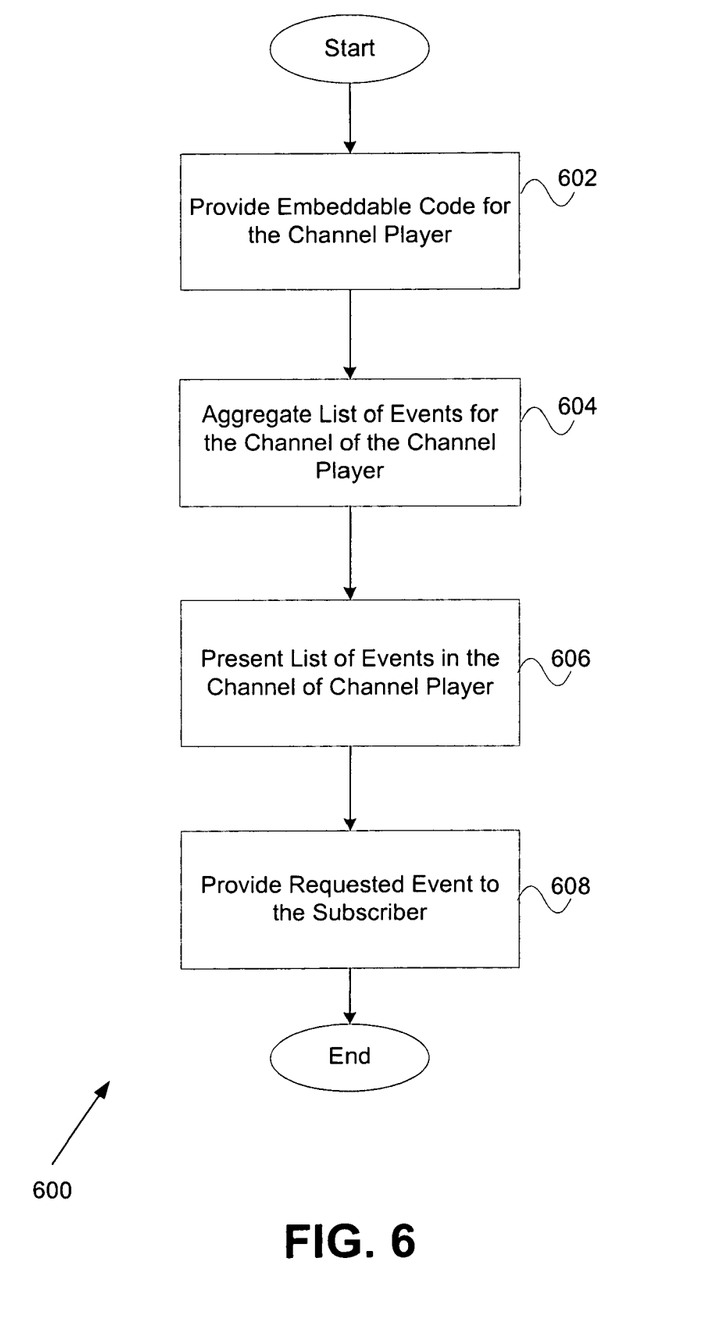
FIG. 6 is a flowchart of an exemplary method for providing the channel player and access to the channel.

Referring now to FIG. 6, an exemplary flowchart 600 of a method for providing the channel of the channel player is shown. In step 602, embeddable software code which provides the channel player and access to the associated channel is provided. In exemplary embodiments, the channel owner device 106 will embed the code into any location where the channel owner associated with the channel owner device 106 desires to locate access to the channel. For example, the channel owner device 106 may embed the code on a website associated with the channel owner. Alternatively, the channel owner device 106 may provide the code to another entity (e.g., server) for embedding on another website. In yet another embodiment, the embedded code may provide access to a stand-alone channel player or direct the user to a channel player associated with the channel management system 102 (e.g., a link to access the channel player via the channel management system 102).

Next in step 604, a list of events is aggregated for the channel. In exemplary embodiments, the channel owner device 106 or presenter devices 108 may establish an event by providing details regarding the event. For example, the presenter may provide a date, time, title of event, and short description of the event to the event module 302. This will then establish an upcoming event. Additionally, past events may be archived and saved in the content database 218.

When a subscriber device 116 activates the channel player, the list of events in the associated channel may be presented to subscriber device 116 in step 606. In exemplary embodiments, an up-to-date list of events may be presented whenever the subscriber device 116 accesses the channel. The list of events may comprise upcoming events, archived events, and/or a current (i.e., live) event. The list may be provided in chronological order or any other order desired by the channel owner (e.g., alphabetically by title, by presenter, etc.) Any combination and number of events may be provided in the list of events. An example of a graphical interface illustrating the list is shown in FIG. 4a.

Should the subscriber device 116 request access to an event, the event is provided to the subscriber device 116 in step 608. Step 608 will be discussed in more details in connection with FIG. 7 below.

It should be noted that the method of the flowchart 600 of FIG. 6 is exemplary. Alternative embodiments may comprise more, less, or functionally equivalent step and still be within the scope of exemplary embodiments.

Figure 7:
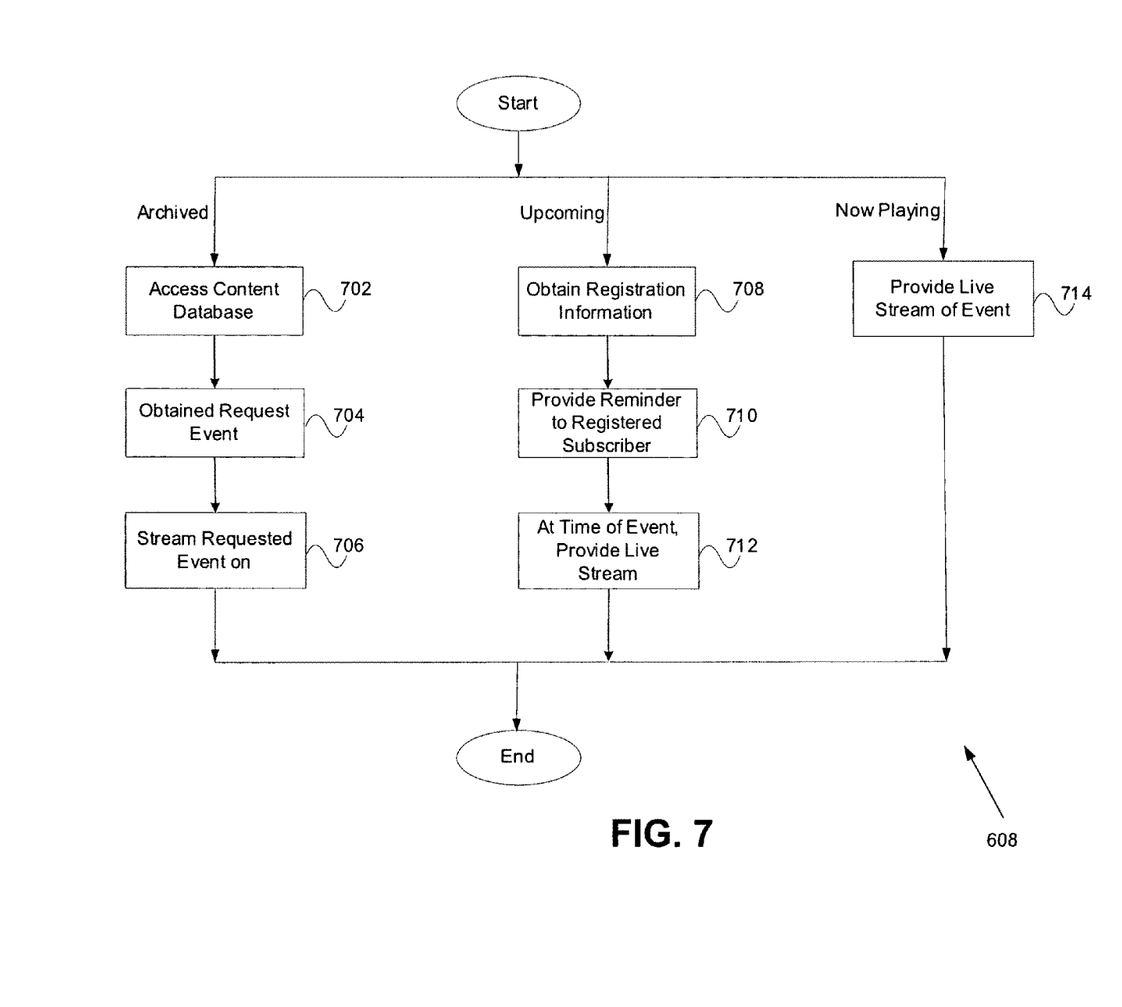
FIG. 7 is a flowchart of an exemplary method for providing an event within the channel player.

Referring now to FIG. 7, an exemplary flowchart of a method for providing the requested event (i.e., step 608) is shown. Initially, a determination (not shown) is made as to whether the requested event is a past (i.e., archived) event, an upcoming event, or a current (i.e., live) event. If the requested event is an archived event, then the content database 218 is accessed in step 702. In exemplary embodiments the archive module 310 will access the content database 218 to retrieve the archived event (step 704). The archived event is then streamed to the channel player associated with the requesting subscriber device 116 (step 706).

If the requested event is an upcoming event, then in step 708, registration for the event occurs. For example, the subscriber device 116 may be presented with a graphical interface in which the subscriber device 116 may provide registration information. In one embodiment, the subscriber may simply activate a button that indicates their interest in attending the event in order to register. Once registered, the subscriber may be provided with a reminder in option step 710 as the event start time approaches. In one embodiment, the reminder may be a message sent by the messaging module 226 (e.g., e-mail, text message, etc.).

At the time of the event, the event is streamed live to the instance of the channel player associated with the subscriber device 116 in step 712.

If the requested event is a current, live event, then in step 714, the live event is immediately streamed to the subscriber device 116. In exemplary embodiments, the subscriber device 116 will access the event in a live mode. That is, for example, if the subscriber device 116 accesses the live event halfway into the event, then the subscriber device 116 may start receiving the live feed in the middle of the event.

It should be noted that the method of the flowchart 700 of FIG. 7 is exemplary. Alternative embodiments may comprise more, less, or functionally equivalent step and still be within the scope of exemplary embodiments.

The above-described modules, engines, components, and functions can be comprised of instructions that are stored on a computer-readable or machine-readable storage medium. The instructions can be retrieved and executed by a processor. Some examples of instructions are software, program code, and firmware. Some examples of storage medium are memory devices, tapes, disks, integrated circuits, and servers. The instructions are operational when executed by the processor to direct the processor to operate in accordance with the invention. Those skilled in the art are familiar with instructions, processors, and storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

What is claimed is:

1. A method for providing a channel of webcasts, each webcast presented within a channel player, the method comprising:
provic an embeddable code associated with the channel player, the embeddable code being positioned in any location to embed access to an instance of the channel player;
aggregating a list of webcasts in the channel, wherein the list of webcasts includes at least one archived live webcast, an upcoming live webcast, and a live webcast;
presenting the list of webcasts within the channel player;
receiving a request from the list of webcasts within the channel player, the request for presentation of the upcoming live webcast at a presentation time;
replacing within the channel player at the presentation time the list of webcasts with a data stream of a requested live webcast;
archiving the requested live webcast after the presentation time;
replacing within the channel player after the presentation time the data stream of the requested live webcast with a new list of webcasts; and
listing the archived live webcast as an archived live webcast within the new list of webcasts within the channel player.

2. The method of claim 1 wherein aggregating the list of webcasts comprises providing a channel interface listing the webcasts in the channel.

3. The method of claim 2 further comprising distinguishing a current or next webcast entry on the channel interface.

4. The method of claim 1 wherein providing the requested webcast comprises providing live audio.

5. The method of claim 4 further comprising synchronizing the live audio with images in real time.

6. The method of claim 4 wherein the live audio is obtained from a video.

7. The method of claim 1 wherein providing the requested webcast comprises accessing and providing the channel player with an archived webcast.

8. The method of claim 1 further comprising maintaining an archive of all past, recorded webcasts.

9. The method of claim 1 wherein providing the requested webcast comprises obtaining registration information from a subscriber for an upcoming webcast.

10. The method of claim 1 wherein providing the requested webcast comprises sending a reminder to a subscriber about an upcoming webcast.

11. The method of claim 1 further comprising providing a search mechanism for finding one or more webcasts from the list of webcasts.

12. The method of claim 1, wherein the list of webcasts comprises an upcoming webcast, the list of webcasts further comprising a countdown clock until the upcoming webcast becomes live.

13. A system for providing a channel of webcasts, each webcast presented within a channel player, the system comprising:
a processor executing instructions within modules, the modules including:
a code module configured to generate an embeddable code associated with the channel player, the embeddable code being positioned in any location to embed access to an instance of the channel player;
a webcast module configured to establish one or more upcoming webcasts on the channel and aggregate a list of webcasts in the channel, wherein the list of webcasts includes at least one archived live webcast, an upcoming live webcast, and a live webcast;
an interface module configured to present the list of webcasts within the channel player; and
a webcast distribution module configured to:
receive a request from the list of webcasts within the channel player, the request for presentation of the upcoming live webcast at a presentation time;
replace within the channel player at the presentation time the list of webcasts with a data stream of a requested live webcast;
archive the requested live webcast after the presentation time;
replace within the channel player after the presentation time the data stream of the requested live webcast with a new list of webcasts; and
list the archived live webcast as an archived live webcast within the new list of webcasts within the channel player.

14. The system of claim 13 wherein the webcast distribution module comprises a distribution module configured to stream a live webcast to the channel player.

15. The system of claim 13 wherein the webcast distribution module comprises an archive module configured to obtain and stream an archived webcast to the channel player.

16. The system of claim 13 further comprising a media encoder configured to synchronize live audio and pre-recorded images in substantially real time.

17. The system of claim 13, wherein the list of webcasts comprises an upcoming live webcast, the list of webcasts further comprising a countdown clock until the upcoming live webcast becomes live.

18. A machine-readable non-transitory medium having embodied thereon a program, the program providing instructions for a method for providing a channel of webcasts in a channel player, the method comprising:
providing an embeddable code associated with the channel player, the embeddable code being positioned in any location to embed access to an instance of the channel player;
aggregating a list of webcasts in the channel, wherein the list of webcasts includes at least one archived live webcast, an upcoming live webcast, and a live webcast;
presenting the list of webcasts within the channel player;
receiving a request from the list of webcasts within the channel player, the request for presentation of the upcoming live webcast at a presentation time;
replacing within the channel player at the presentation time the list of webcasts with a data stream of a requested live webcast;
archiving the requested live webcast after the presentation time;
replacing within the channel player after the presentation time the data stream of the requested live webcast with a new list of webcasts; and
listing the archived live webcast as an archived live webcast within the new list of webcasts within the channel player.

* * * * *